United States Patent
Andrew et al.

(10) Patent No.: US 6,567,104 B1
(45) Date of Patent: May 20, 2003

(54) TIME-BASED DYNAMIC USER INTERFACE ELEMENTS

(75) Inventors: Felix G. T. I. Andrew, Seattle, WA (US); David A. Sobeski, Redmond, WA (US); Michael D. Smith, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/315,447

(22) Filed: May 20, 1999

(51) Int. Cl.[7] ................................................ G06F 7/00
(52) U.S. Cl. ........................................ 345/762; 345/764
(58) Field of Search ........................... 345/762, 764, 345/781, 784, 835, 839, 853, 854; 707/4, 102, 501, 514

(56) References Cited

U.S. PATENT DOCUMENTS

| | | | | |
|---|---|---|---|---|
| 5,414,809 A | * | 5/1995 | Hogan et al. | 345/765 |
| 5,785,418 A | * | 7/1998 | Hibbetts | 707/4 |
| 5,905,492 A | | 5/1999 | Straub et al. | |
| 5,961,602 A | * | 10/1999 | Thompson et al. | 709/229 |
| 5,991,735 A | | 11/1999 | Gerace | |
| 6,014,135 A | * | 1/2000 | Fernandes | 345/762 |
| 6,072,486 A | | 6/2000 | Sheldon et al. | |
| 6,085,229 A | | 7/2000 | Newman et al. | |
| 6,101,486 A | | 8/2000 | Roberts et al. | |
| 6,128,016 A | * | 10/2000 | Coelho et al. | 345/808 |
| 6,141,010 A | * | 10/2000 | Hoyle | 345/853 |
| 6,154,213 A | | 11/2000 | Rennison et al. | |
| 6,236,768 B1 | | 5/2001 | Rhodes et al. | |
| 6,271,845 B1 | | 8/2001 | Richardson | |
| 6,282,547 B1 | * | 8/2001 | Hirsch | 707/102 |
| 6,327,574 B1 | | 12/2001 | Kramer et al. | |
| 6,405,159 B2 | | 6/2002 | Bushey et al. | |

* cited by examiner

*Primary Examiner*—Cao H. Nguyen
(74) *Attorney, Agent, or Firm*—Woodcock Washburn LLP

(57) ABSTRACT

Methods and systems for providing user interfaces that include content selected based on when the user interface is being provided are disclosed. A temporal engine residing on a host computer system provides a user interface that includes content selected based on when the user interface is being provided. The computer system includes a data store having one or more predefined time periods, each of which is defined, at least in part, by a span of time or by a set of conditions being satisfied, and is associated with a predefined set of user interface elements. The temporal engine determines, for each predefined time period, whether the set of conditions that defines the time period is satisfied. If so, the temporal engine causes a user interface to be provided that is based on the set of user interface elements associated with the time period. The temporal engine continues running in the background on the host computer system and dynamically updates the user interface whenever one predefined time period ends and another begins.

16 Claims, 3 Drawing Sheets

TIME-BASED DYNAMIC USER INTERFACE ELEMENTS

RELATED APPLICATIONS

The subject matter disclosed herein is related to the subject matter disclosed in copending application Ser. No. 09/315,578, filed on even date herewith, titled "Context-Based Dynamic User Interface Elements."

TECHNICAL FIELD

The present invention relates generally to the field of computer user interfaces, and more particularly to methods and systems for providing user interfaces that include content selected based on when the user interface is being provided.

BACKGROUND OF THE INVENTION

The user of a computer typically communicates with the computer's operating system and applications via user interfaces (UIs) specifically designed for each operating system function or application. For example, an Internet browser will have a toolbar, drop down menus, a "favorites" list, and the like. In general, each UI is built from a set of UI elements that provide the application with the information needed to build the user interface. These elements provide information such as the user's "favorites" list, emailbox, toolbars, default directories, etc.

Typically, a user interface is built from the same set of elements every time the user runs a given application, operating system function, or utility, unless the user manually changes one or more of the elements. For example, in connection with an Internet browser, the user may have a favorites list that includes Universal Resource Locators (URLs) for certain preferred Web sites the user accesses frequently. When the user initiates the browser residing on the host computer, the user interface that is built includes, among other things, the user's favorites list in a format the user can access and manipulate. The same favorites list is displayed every time the user initiates the browser and clicks on the "favorites" button on the toolbar. If, however, the user changes the favorites list during a particular session (e.g., adds, modifies, or deletes an entry in the favorites list), the changes are saved and, the next time the user initiates the browser and clicks on the "favorites" button, the new favorites list is displayed. Thus, the user interface for a particular application remains the same, independent of the time of day, day of the week, day of the year, etc., unless the user manually changes it.

It would be beneficial to the user, however, if the host computer system were to change the user interface dynamically depending on the time at which the user experience occurs. For example, a user might like to view certain types of content in the morning, different types of content in the afternoon, and still different types in the evening. Similarly, the user might wish to view certain types of content during the work week, but different types of content on the weekend. In these situations, the user would benefit from a mechanism that provides the user with different user interfaces at different times of the day, different days of the week, or other such spans of time. In general, it would improve the user experience if the applications running on the host computer system were to build user interfaces based on elements that are selected to provide content specifically tailored to the needs of the user based on the time at which the user experience occurs. Additionally, it would be beneficial to have a mechanism for updating time based user interfaces as time progresses.

SUMMARY OF THE INVENTION

The present invention provides improved methods and systems for presenting information to the user of a host computer system. According to the invention, the user interface provided to the user includes content that is selected based on the time at which the user experience occurs. According to the present invention, one or more time periods are predefined, each of which is associated with one or more UI elements that include content determined to be of interest to the user during the associated time period. These UI elements include such information as user preferences, favorites lists, toolbars, default directories, etc.

The predefined time periods can be defined by one or more conditions being satisfied, or simply by a span of time. For example, a time period such as "Morning" can be defined to occur from 6:00 AM until noon. Similarly, a time period such as "Weekend" can be defined to occur from 6:00 PM Friday until 6:00 AM Monday. In yet another example, a time period such as "Christmas" can be defined to occur on December $25^{th}$.

When the user logs onto the host computer system, a temporal engine residing in the host computer determines whether the current experience is occurring during one or more of the predefined time periods. If so, the temporal engine causes applications running on the host computer to provide user interfaces built from the UI elements associated with that time period. Consequently, the user interfaces provide content that has been determined to be relevant to a user experience occurring during that time period. The temporal engine continues to run silently in the background and causes the user interfaces to be updated as time progresses from one predefined time period to another.

For example, if the user logs onto the host computer system in the morning, the temporal engine can provide a user interface built from the UI elements associated with the predefined time period of "Morning." Similarly, if the user logs onto the host computer system in the afternoon, the temporal engine provides a user interface built from the UI elements associated with the predefined time period of "Afternoon." Moreover, if the user logs on in the morning and stays logged on until after noon, the temporal engine causes the user interface to change from that defined for the context of "Morning" to that defined for the context of "Afternoon," etc.

These and other features of the present invention are described in greater detail below.

BRIEF DESCRIPTION OF THE DRAWINGS

The foregoing summary and the following detailed description of presently preferred embodiments are better understood when read in conjunction with the appended drawings, in which.

DETAILED DESCRIPTION OF PREFERRED EMBODIMENTS

Overview

Figure 1:
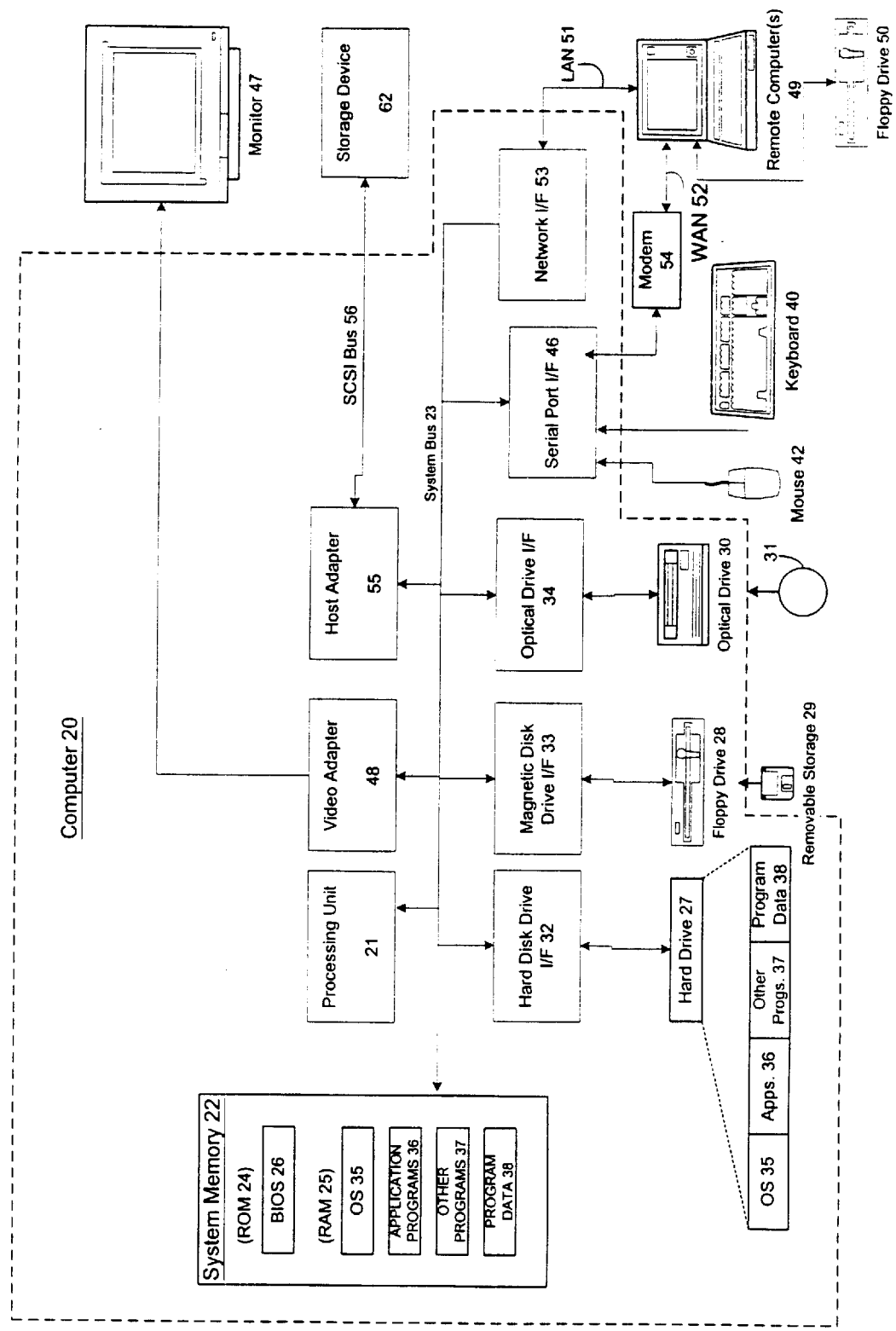
FIG. 1 is a block diagram representing a general purpose computer system in which aspects of the present invention may be incorporated.

The systems and methods of the present invention provide a mechanism for providing the user of a computer system with user interfaces that vary dynamically based on the concept of time. A temporal engine according to the present invention runs on a host computer system, such as a desktop computer, laptop computer, palm-size computer, etc., on which one or more applications can be run. Such computers can be operated on a stand-alone basis or connected to a network, such as local area network, wide area network, intranet or the Internet. Moreover, such computers can be connected to a network via any number of well known wired or wireless media and network protocols.

Before the user interface (UI) for an application is provided, the temporal engine determines the current date and time, and determines what content should be presented to the user for the current user experience. The temporal engine provides the content to the application, which builds the UI based on predefined UI elements. For example, the temporal engine might determine that it is a weekday morning. In this case, the temporal engine can cause the application to build a user interface that includes content that would be beneficial to the user in the morning, such as information about the local weather. On the other hand, if the temporal engine determines that it is a Saturday afternoon, the temporal engine can cause the application to build a user interface that includes content that would be beneficial to the user on a Saturday afternoon, such as information about local entertainment. Additionally, the temporal engine can cause the application to update the user interface dynamically as the day progresses. For example, in the morning, the UI might include information about the local weather, while in the late afternoon, the UI might include information about rush hour traffic. The temporal engine can cause the UI to update automatically, i.e., without user intervention.

To determine the content to be provided for the current user experience, the temporal engine consults a data store residing on the host computer. The data store includes a set of one or more predefined time periods, each of which is defined by a set of conditions. The temporal engine determines whether the current user experience is occurring within any of the predefined time periods, i.e., whether the set of conditions for any of the predefined time periods is satisfied. If the set of conditions for one or more of the predefined time periods is satisfied, the temporal engine determines which content the user interface should provide. If the current user experience is not occurring within any of the predefined time periods, the user interface is built using a set of default elements.

The present invention will now be explained in greater detail with reference to a presently preferred embodiment thereof. First, a description of an exemplary computer environment is provided, and then a detailed description of the inventive methods and systems for building time based, dynamic user interfaces is provided.

Computer Environment

FIG. 1 and the following discussion are intended to provide a brief general description of a suitable computing environment in which the invention may be implemented. Although not required, the invention will be described in the general context of computer-executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, amagnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29, and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner, or the like. These and other input devices are often connected to the processing unit 21 through a serial port interface 46 that is coupled to the system bus, but may be connected by other interfaces, such as a parallel port game port, or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Methods and Systems for Providing a Context-Based User Interface

Figure 2:
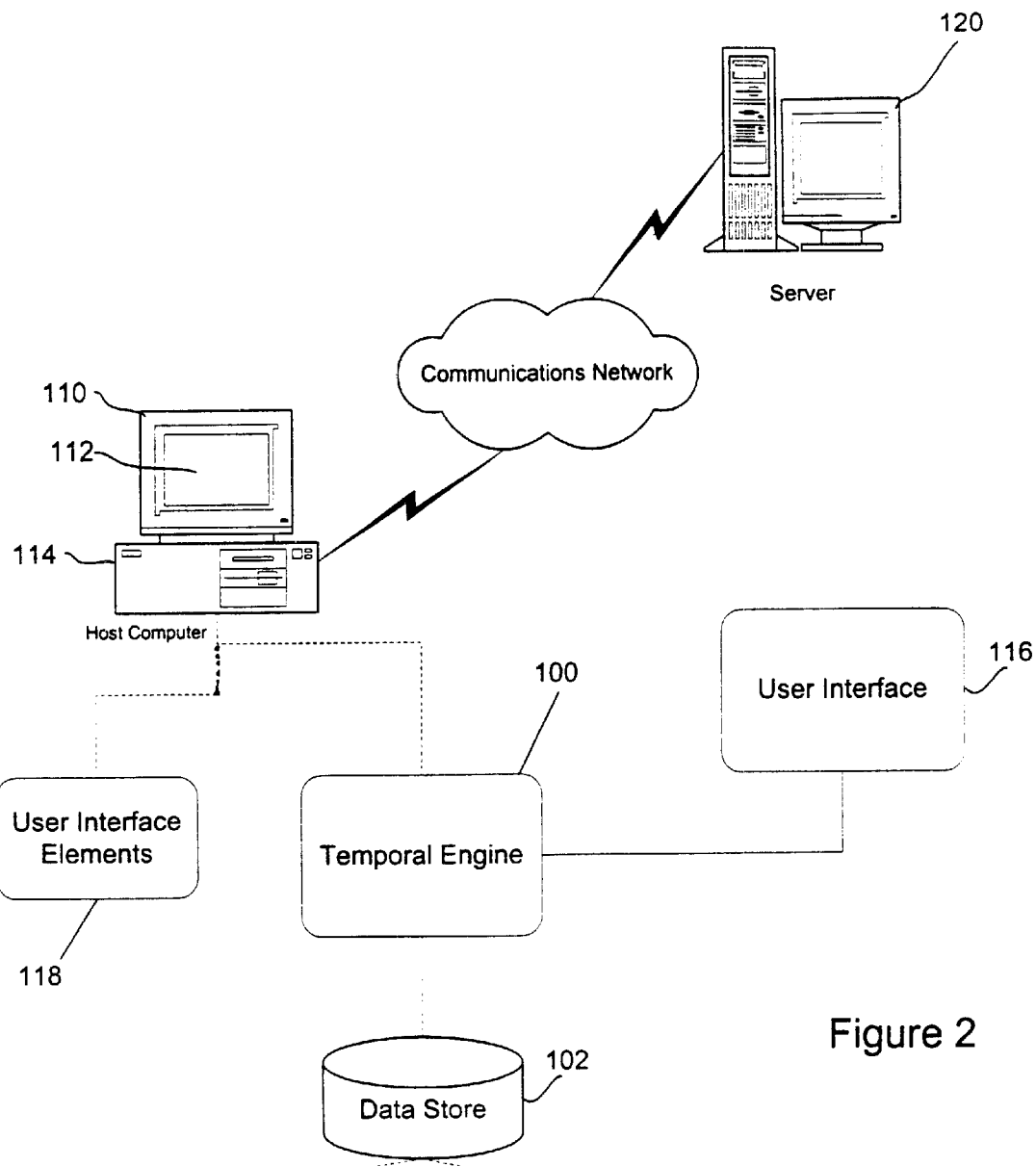
FIG. 2 is a schematic diagram of a host computer system used to build context-based, including time based, user interfaces in accordance with the present invention.

FIG. 2 is a schematic diagram of a host computer system used to provide time-based user interfaces in accordance with the present invention. As shown in FIG. 2, a host computer system 110, such as a personal computer, laptop computer, or the like, includes a video display terminal 112 and a hard drive 114. Host computer 110 can be connected to a server computer 120 via a communications network 130 as shown. The communications network 130 can be any communications network, such as the Internet, an intranet, a wide area network, or a local area network. In an environment in which the communications network 130 is the Internet, the server 120 can be a Web server.

When a user logs onto the host computer system 110, one or more user interfaces 116 can be displayed to the user on the video display terminal 112. The user interface 116 can be the user interface for any application that is currently running on the host computer system 110. For example, the user interface 116 can be the user interface to a word processor program, spreadsheet, Internet browser, etc.

The user interface 116 can be built using one or more UI elements 118 that reside on the host computer system 110. Typically, these UI elements 118 reside on the computer's hard drive 114. The UI elements 118 can include, but are in no way limited to, elements that provide the user interface 116 with the user's "favorites" list, the user's emailbox, toolbars, preferences, etc. More generally, the UI elements 118 can be described as any elements that can be used to build any part of a user interface 114 for an application running on the host computer system 110. The user interface 114 can also include content that is provided from the server 120 to the host computer system 110 over the communications network 130.

The host computer system 110 also includes a temporal engine 100. Before the user interface 116 is presented to the user, the temporal engine 100 identifies the UI elements 118 that are to be used to build the user interface 116. According to the present invention, the user interface 116 is based on the time at which the current user experience occurs. Thus, the invention provides a mechanism to provide the user with user interfaces that include content that is most likely to be valuable to the user during the current user experience. For example, the user might desire a user interface that displays different content in the morning, from that which the user might desire at night. Similarly, the user might like to have different UI content on weekdays and weekends, holidays and work days, etc.

The temporal engine 100 determines what content a user interface should provide by accessing the data store 102 that resides on the host computer system 110, preferably on the host computer's hard drive 114. The data store 102 includes one or more predefined time periods, each of which is defined by one or more conditions. For example, the data store 102 shown in FIG. 2 includes three predefined time periods: "Morning," "Afternoon," and "Weekend." Before the user interface 116 is presented to the user, the temporal engine 100 determines whether the current user experience is occurring during one or more of the predefined time periods by determining whether the conditions that define one or more of the predefined time periods are satisfied. If all the conditions that define a predefined time period are satisfied, then the current user experience is determined to be occurring during that predefined time period. For example, the current user experience is occurring at 9:00 AM, it is occurring during the predefined time period of "Morning."

The data store 102 also includes pointers to one or more UI elements associated with each predefined time period. Any number of predefined time periods can be defined and, in a preferred embodiment of the present invention, the temporal engine 100 enables the user to define them. For example, time periods can be defined for morning, noon, and night; weekdays and weekends, or for specific days of the week, or of the year (e.g., "Christmas").

As shown in FIG. 2, the time period of "Morning" is defined as any time of any day after 6:00 AM and before noon. The time period of "Afternoon" is defined as any time of any day after noon and before 5:30 PM. The time period of "Weekend" is defined as any time after 6:00 PM Friday and before 6:00 AM Monday. The time periods shown in FIG. 2, and the conditions defining them, are purely arbitrary and are provided for exemplary purposes only. Any number of time periods can be defined, based on any number or combination of conditions. For example, the time period of "Spring" can be defined as any date after March 21 and before June 21, the time period of "Football Season" can be defined as any date after September 1 and before January 31, etc.

Once the temporal engine 100 determines whether the current user experience is occurring within a predefined time period, it determines from the data store 102 which UI elements 118 are associated with that time period. The temporal engine 100 maintains a reference to each active application so that the temporal engine can deliver the associated UI elements 118 to the application. The application then builds a user interface 116 using the UI elements 118 that the temporal engine 100 identified as being associated with the current context.

Consider an exemplary scenario wherein the user of a host computer 110 logs on at 9:00 AM on a Monday. The temporal engine 100 determines that the current user experience is occurring during the predefined time period of "Morning" because both conditions that define the time period of "Morning" are satisfied. The temporal engine 100 then determines from the data store 102 that the UI elements associated with "Morning" include the user's so-called "Morning Favorites" list, and content relating to "Foreign Markets." The temporal engine identifies the associated elements to the application which builds the user interface 116, at least if in part, from the identified UI elements 118. For example, if the user were to initiate a network browser program residing on the host computer 110, the browser would provide the user's "Morning Favorites" list and content relating to "Foreign Markets." The content provided via the user interface can either be resident on the host computer, or delivered to the host computer from the server 120.

The temporal engine 100 continues to run silently in the background (i.e., without interacting with the user). Whenever the user initiates a new application, the temporal engine 100 provides the application with the UI elements 118 to build the user interface 116 the user has defined for the current time period. Additionally, with the temporal engine 100 running in the background, the temporal engine 100 can determine, as time progresses, whether the current time period has expired and whether the user experience is now occurring during a different predefined time period. For example, if the user in the above example continues "surfing the net" until noon, the temporal engine will determine that the time period of "Morning" has expired, and that the user experience is now occurring during the time period of "Afternoon." In that case, the temporal engine 100 will determine whether any of the applications currently running on the host computer 110 ("active applications") are affected by the change from one predefined time period to the other. That is, the temporal engine determines from the data store 102 whether the change in time period will necessitate a change in the UI elements 118 used to build the user interface for any of the active applications. If the temporal engine 100 determines that any of the active applications is affected by the change, the temporal engine 100 alerts the affected application that it needs to change its user interface 116. The temporal engine 100 then identifies the UI elements 118 associated with the new time period, and the affected applications build new user interfaces using the identified elements. Thus, in the above example, the temporal engine 100 would cause the user's active desktop to change automatically (i.e., without user intervention) at noon from its "Morning" display to its "Afternoon" display.

Note that a given user experience can be occurring during more than one predefined time period simultaneously. For example, on a Saturday at 5:15 in the afternoon, the conditions are satisfied for both of the time periods "Afternoon" and "Weekend." When the current user experience is occurring during more than one time period simultaneously, there are likely to be conflicts among the UI elements that should be presented. For example, the user might have associated his work emailbox with the context of "Afternoon," and his home emailbox with the context of "Weekend." On a Saturday afternoon, however, a conflict arises as to which emailbox to provide.

In a preferred embodiment, this conflict is resolved by assigning a "weight" to each of the conditions that define the time periods. In the example of FIG. 2, the time period of "Weekend" is given a higher weight than the time period of "Afternoon," indicating that on a Saturday afternoon, the user's Personal emailbox will be provided, rather than the user's work emailbox. Any hierarchy of weights can be assigned. For example, the time period of "Christmas" might be defined with a weight such that the UI elements associated with "Christmas" will be provided regardless of the day of the week on which December $25^{th}$ falls, or the time of day at which the user logs onto the host computer system 110.

Figure 3:
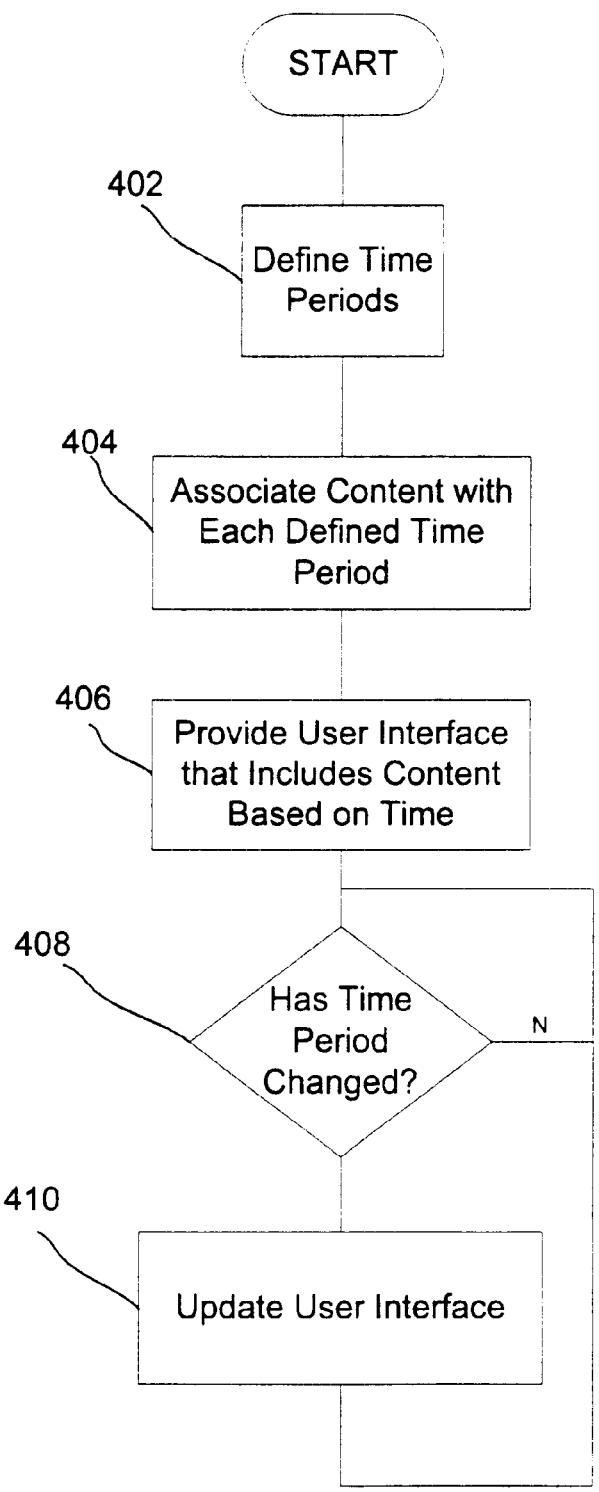
FIG. 3 is a flowchart of a method for building context-based user interfaces in accordance with the present invention.

FIG. 3 is a flowchart of a method 400 for building time-based user interfaces in accordance with the present invention. As shown in FIG. 3, one or more time periods are defined at step 402, each of which is defined by a span of time, or by a set of one or more conditions being satisfied. The conditions can be based on the time of day, the date, the day of the week, etc.

At step 404, each predefined time period is associated with a set of UI elements that can be used to build a user interface that includes content determined to be relevant to a user experience occurring during the associated time period. At step 406, a temporal engine running in the background on the host computer system determines, for each predefined time period, whether the current time is within the predefined time period (e.g., whether the set of conditions that defines the context is satisfied).

If, at step 406, the temporal engine determines that the current user experience is occurring within one or more of the predefined time periods, the temporal engine provides, at step 408, a user interface based on the set of UI elements associated with that time period. The temporal engine provides the user interface by identifying for an application running on the host computer system, the set of UI elements associated with the predefined time period. The application then builds the user interface based on the predefined set of UI elements associated with the predefined time period, whereby content relevant to the user experience is provided to the user based on time.

The temporal engine continues running in the background on the host computer system and dynamically updates the user interface as the time of day progresses by repeating steps 406 and 408 as long as the user is logged onto the host computer system. Whenever one predefined time period ends and another begins, the content provided via the user interface is updated.

An important feature of the preferred embodiments of the invention is the use of a temporal engine that resides on a host computer system that provides the user with user interfaces that include content based on the time at which the user experience is occurring. Moreover, the temporal engine dynamically updates the user interfaces as time progresses. It is understood, however, that the invention is susceptible to various modifications and alternative embodiments. It should be understood that there is no intention to limit the invention to the specific embodiments described herein. On the contrary, the invention is intended to cover all modifications, alternative constructions, and equivalents falling within the scope and spirit of the claimed invention.

We claim:

1. A computer readable storage medium comprising:
    a data store that includes a plurality of predefined time periods, wherein each predefined time period is associated with a respective predefined set of user interface elements; and
    computer-executable instructions for determining whether a current time is within at least one of the predefined time periods, and for providing a user interface that is based on the respective predefined set of user interface elements that is associated with the at least one predefined time period.

2. The computer readable storage medium of claim 1, wherein the at least one predefined time period is defined by a set of prescribed conditions being satisfied.

3. The computer readable storage medium of claim 2, comprising further computer executable instructions for determining whether the set of prescribed conditions that defines the at least one predefined time period is satisfied.

4. The computer readable storage medium of claim 3, comprising further computer-executable instructions for updating the user interface, if the set of prescribed conditions that defines a second predefined time period is satisfied, based on the respective predefined set of user interface elements associated with the second predefined time period.

5. The computer readable storage medium of claim 2, wherein at least one of the prescribed conditions is based on the time of day.

6. The computer readable storage medium of claim 2, wherein at least one of the prescribed conditions is based on the date.

7. The computer readable storage medium of claim 1, wherein the at least one predefined time period is defined by a span of time.

8. The computer readable storage medium of claim 7, comprising further computer executable instructions for determining, for the at least one predefined time period, whether a current user experience is occurring during the span of time.

9. The computer readable storage medium of claim 8, comprising further computer-executable instructions for updating the user interface, if the current user experience is occurring during the span of time, based on the respective predefined set of user interface elements associated with the at least one predefined time period.

10. A method for providing a user interface that includes content selected based on when the user interface is being provided, on a computer having a data store that includes at least one predefined time period, wherein each said time period is defined by a set of conditions being satisfied and is associated with a predefined set of user interface elements, the method comprising:
  determining, for each said predefined time period, whether the set of conditions that defines the time period is satisfied; and
  if the set of conditions that defines the time period is satisfied, providing the user interface based on the predefined set of user interface elements associated with the predefined time period.

11. A method for dynamically updating a user interface that includes content selected based on when the user interface is being provided, the method comprising:
  defining a first time period that is defined at least in part by a first span of time;
  associating at least one user interface element with the first defined time period;
  making a first determination of the current time;
  determining whether the current time falls within the first span of time; and
  if the current time falls within the first span of time, providing a first user interface based on the user interface elements associated with the first defined time period.

12. The method of claim 11, further comprising:
  defining a second time period that is defined at least in part by a second span of time;
  associating at least one user interface element with the second defined time period;
  making a second determination of the current time;
  determining whether the current time falls within the second span of time; and
  if the current time falls within the second span of time, providing a second user interface based on the user interface elements associated with the second defined time period, whereby the user interface is dynamically updated.

13. A computer system for dynamically updating a user interface that includes content selected based on when the user interface is being provided, the computer system comprising:
  a data store that includes a first time period that is defined at least in part by a first span of time, and a reference to at least one user interface element associated with the first defined time period; and
  a temporal engine that makes a first determination of the current time; determines whether the current time falls within the first span of time; and if the current time falls within the first span of time, provides to a user at the host computer system a first user interface based on the user interface elements associated with the first defined time period.

14. The computer system of claim 13, wherein the data store further includes a second time period that is defined at least in part by a second span of time, and a reference to at least one user interface element associated with the second defined time period; and
  wherein the temporal engine makes a second determination of the current time;
  determines whether the current time falls within the second span of time; and if the current time falls within the second span of time, provides to the user a second user interface based on the user interface elements associated with the second defined time period.

15. The computer system of claim 13, wherein the temporal engine identifies the user interface elements to an application, and the application builds the user interface based on the user interface elements.

16. The computer system of claim 13, wherein at least one of the user interface elements provides functionality to the user interface.

* * * * *